Figure 1:
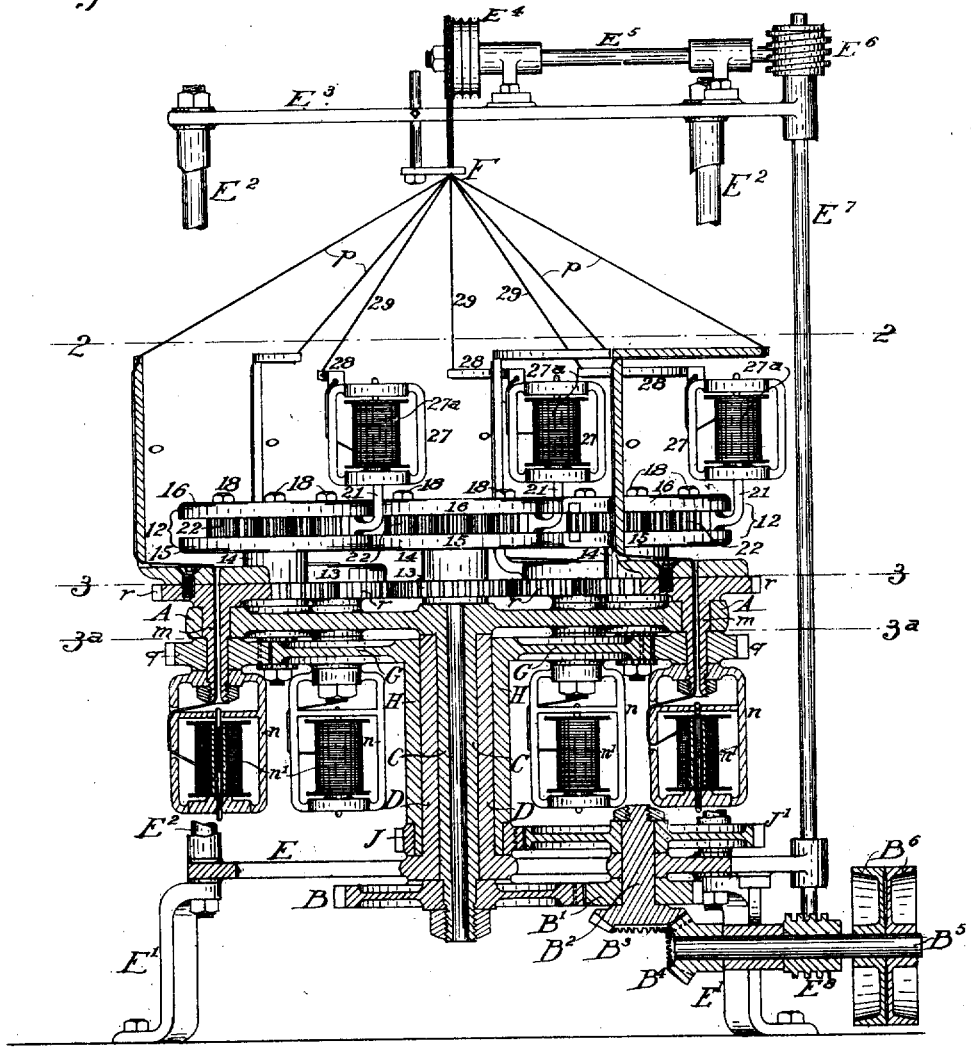

No. 897,680. PATENTED SEPT. 1, 1908.
J. P. TOLMAN & H. G. PRATT.
CORD MAKING MACHINE.
APPLICATION FILED NOV. 9, 1907.

5 SHEETS—SHEET 1.

WITNESSES:
M. S. Flaherty.
W. P. O'Brien.

INVENTORS.
James P. Tolman
Herbert G. Pratt
BY
ATTORNEYS.

No. 897,680. PATENTED SEPT. 1, 1908.
J. P. TOLMAN & H. G. PRATT.
CORD MAKING MACHINE.
APPLICATION FILED NOV. 9, 1907.

WITNESSES:
M. E. Flaherty.
W. P. O'Brien

INVENTORS.
James P. Tolman
Herbert G. Pratt
BY
ATTORNEYS.

No. 897,680. PATENTED SEPT. 1, 1908.
J. P. TOLMAN & H. G. PRATT.
CORD MAKING MACHINE.
APPLICATION FILED NOV. 9, 1907.

5 SHEETS—SHEET 3.

WITNESSES:
M. E. Flaherty
W. P. O'Brien

INVENTORS.
James P. Tolman
Herbert G. Pratt
BY
ATTORNEYS.

No. 897,680. PATENTED SEPT. 1, 1908.
J. P. TOLMAN & H. G. PRATT.
CORD MAKING MACHINE.
APPLICATION FILED NOV. 9, 1907.
5 SHEETS—SHEET 4.
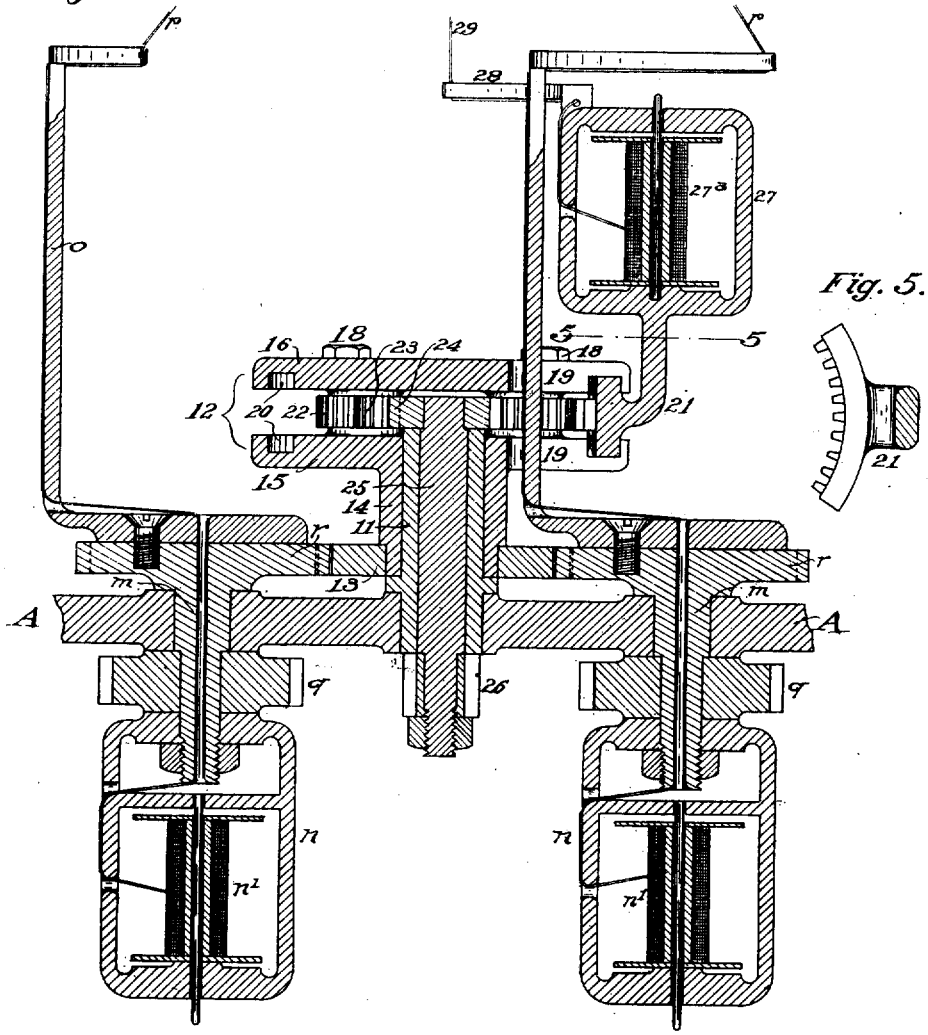
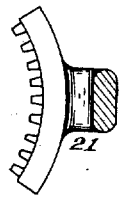
WITNESSES:
M. E. Flaherty
W. P. O'Brien
INVENTORS.
James P. Tolman
Herbert G. Pratt
BY
Clauder Raymond Bowen
ATTORNEYS.

UNITED STATES PATENT OFFICE.

JAMES P. TOLMAN AND HERBERT G. PRATT, OF NEWTON, MASSACHUSETTS, ASSIGNORS TO SAMSON CORDAGE WORKS, OF BOSTON, MASSACHUSETTS, A CORPORATION OF MASSACHUSETTS.

CORD-MAKING MACHINE.

No. 897,680.     Specification of Letters Patent.     Patented Sept. 1, 1908.

Application filed November 9, 1907. Serial No. 401,442.

*To all whom it may concern:*

Be it known that we, JAMES P. TOLMAN and HERBERT G. PRATT, both of Newton, in the county of Middlesex and State of Massachusetts, citizens of the United States, have invented a new and useful Improvement in Cord-Making Machines, of which the following is a specification.

Our invention relates to machinery for making that class of cords in which the component strands are so joined together as to be united in an interlocking twist, all of the strands encircling a common axis in a common direction and each strand locking with two or more other strands by encircling or wrapping them in such manner that all of the strands are united into a common fabric. Such cord is commercially known as "braided cord" and is described in the United States Patent No. 20,691, granted to James A. Bazin June 29, 1858. Several differently organized machines have been used for producing such a braid. Such machines have been described in United States Patent No. 56,485 granted to said Bazin, United States Patent No. 232,920 granted to Barnes, and United States Patent No. 276,201 to Tolman. In all of these machines the bobbin-carrying travelers are moved by carrier gears from one position of rest in a holding ring to another position, some form of movable switch or selector being required to govern the sequence of these movements. Similar results are also obtained in the machines described in the patents to Winchester, No. 227,940, and Tolman, No. 340,835, but in these cases the results are obtained by the conformation of a looped track in which the travelers are moved by carrier gears and in which the form of the track itself dispenses with the need of movable switches.

A higher speed than has heretofore been possible in the machines above referred to is very desirable and our present invention is for the purpose of securing such increased speed of operation with a corresponding diminution of wear by dispensing with both movable switches and looped tracks and making all movements of bobbin holders circular and continuous around their actuating sources.

To accomplish our desired result we divide the bobbin holders into two classes. The bobbin holders of one class are placed below the main table of the machine and deliver their strands through hollow spindles mounted thereon and by bent fliers. The bobbin holders of the other class are placed above the main table of the machine and are mounted on carriers which travel in circular tracks around what for convenience may be termed track heads carried on spindles upon the main table intermediate of the spindles which carry the fliers for the bobbins below the table, these parts being in close proximity so that their rotary movements may give the required interlocking to the strands.

The carriers travel around their respective track heads in the same direction as the fliers and the rotary speed of these carriers and of the flyers is the same. The track heads, however, upon which the carriers are mounted rotate at equal rotary speed but in an opposite direction from the carriers and fliers. Each track head is provided with a gap (in the form of our invention shown) which is adapted to register with adjacent fliers in their movements, so that as the fliers rotate and the track heads rotate the fliers may cut into the circle of rotation of the periphery of the track heads. At the same time each carrier is propelled about the periphery of its track head so that the strand borne by each flier is enabled to pass around the strands borne by the adjacent carriers so that each flier passes in turn around the strand of the carrier on each side of it and the strand of each carrier in turn is interlocked by the strand of the flier on each side of it.

In this construction we prefer, where the machine is of comparatively small size, to rotate the table and provide a stationary forming die at the braiding point where the several strands are united into a cord, this action giving a proper twist during the braiding action and the cord being led off to a reel or basket. It is, however, equally possible and is desirable, where the machine is of a larger size, to make the table stationary. In this case the encircling of the common axis or main twist of the cord is accomplished by mounting the reel upon which the finished cord is to be wound upon a revolving frame and preferably supporting the forming die upon this frame.

Our invention will be understood by reference to the drawings, which show one form of its embodiment and in which—

Figure 2:
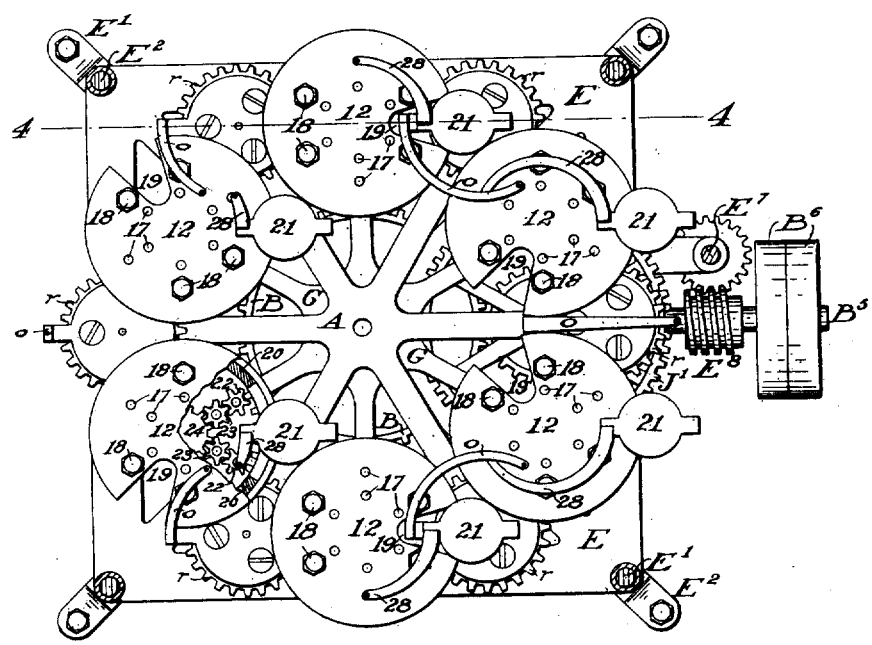
Figure 3:
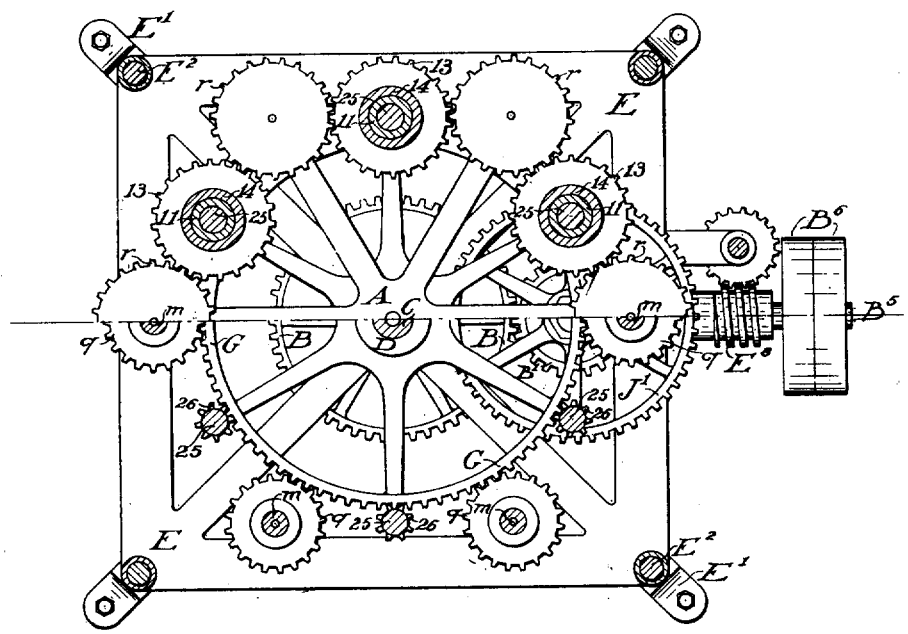
Figure 6:
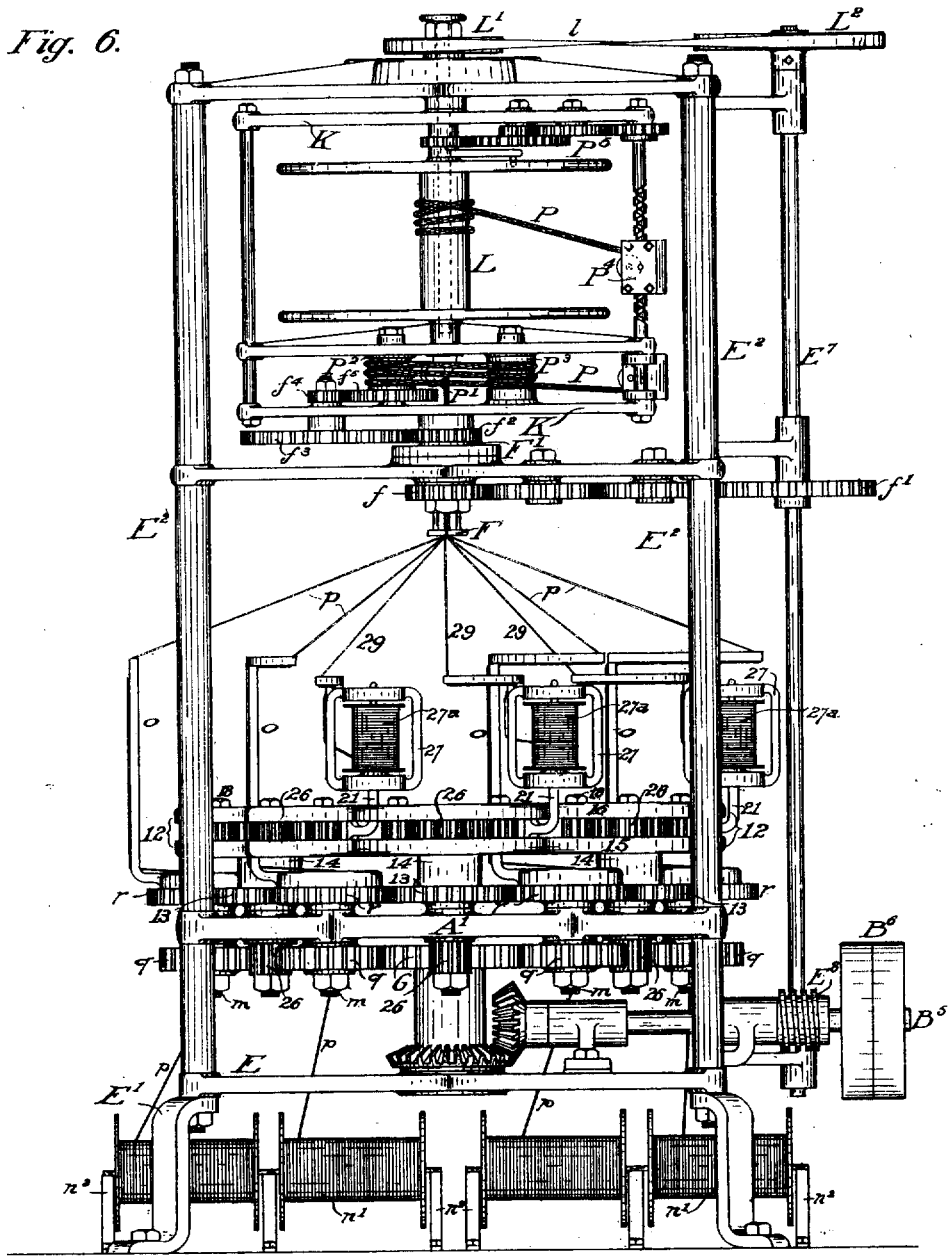

Figure 1 is a front view of the machine, the lower portion thereof being in section. Fig. 2 is a plan, the portion of the frame-work above the line 2—2 of Fig. 1 being omitted. Fig. 3 is a sectional view taken partly on the line 3—3 of Fig. 1 and partly on line $3^a$—$3^a$ of Fig. 1. Fig. 4 is a section on line 4—4 of Fig. 2, and Fig. 5 is a section on line 5—5 of Fig. 4. Fig. 6 shows in elevation a modified form of our invention.

A is a rotary table supported on the upper end of a hollow post D which rises from the center of the plate E. This plate is supported on legs $E^1$ and carries uprights $E^2$ which are connected at their upper ends by braces $E^3$, from which the die F depends.

Depending from and integral with the table A is a spindle C which runs within the post D and carries at its lower end a gear B. Rotary motion is given to the gear B and hence to the table A from the shaft $B^5$ which carries fast and loose pulleys $B^6$ at one end and at the other a bevel gear $B^4$ meshing with the bevel gear $B^3$ on the stud $B^2$ supported in the plate E, this stud $B^2$ also carrying a gear $B^1$ in mesh with the gear B.

The spindle C we prefer to make hollow in order that when we wish to braid a covering about a core, the core may be introduced through the axis of the spindle to the die F.

Journaled in the table A are a set of tubular spindles $m$. Each spindle carries a bobbin frame $n$ at its lower end below the table A and at its upper end a flier $o$. Each bobbin frame $n$ carries a bobbin $n^1$ the strand $p$ from which passes up through the tube in its spindle $m$ to its flier $o$ from which it runs to the die F.

Each spindle $m$ is rotated by a gear $q$, motion being imparted to the gears $q$ by means of the central gear G mounted upon the upper end of a sleeve H which revolves about the post D and acquires its motion through the gear J in mesh with the gear $J^1$ on the stud $B^2$.

Secured in the table A midway between the spindles $m$ is a series of tubes 11 all equidistant from the center of the table on each of which is mounted a track head 12. Each track head is composed of a lower plate 15 and an upper plate 16 separated by studs 17 secured in the lower plate, a suitable number of said studs having nuts 18 upon their upper ends for securing the upper plate in position, certain of these studs also carrying pinions 22 and 23 for the purposes below described. Each lower plate 15 is mounted on a sleeve 14 capable of rotation about the tube 11 and carrying a gear 13 in mesh with gears $r$ mounted on the adjacent flier spindles $m$. All the gears 13 and $r$ are of equal diameter and are provided with an equal number of teeth so that all rotate with equal speed though each group of parts rotates in a different direction from the other group.

A circular track 20 (see Figs. 2 and 4) is formed in the upper side of each plate 15 and the under side of each plate 16, these tracks being opposite each other and serving as a runway for a segmental carrier 21, one such carrier running in each track head. Each carrier is caused to travel constantly by the following means: Each segmental carrier has gear teeth on its inner face (see Fig. 5) which engage the pinions 22 which meshing with intermediate pinions 23, are rotated from a central gear 24 mounted at the upper end of the spindle 25 which is journaled in the tube 11 and carries at its lower end a gear 26 which meshes with the main central gear G.

It will be noted that the segmental portion of each carrier 21 is of sufficient length to be engaged by each pinion 22 in turn before the preceding pinion of the series is disengaged.

Each carrier 21 carries a bobbin frame 27 and bobbin $27^a$ from which the strand 29 is directed to the braiding point F by means of a suitably formed arm 28.

In order to provide for the proper interlocking of the strands 29 coming from the bobbins $27^a$ and the strands $p$ coming from the bobbins $n^1$ it is of course necessary that each flier shall pass around the carrier on each side of it and each carrier shall pass around the flier on each side of it and for this purpose we provide what we have termed a gap or deep notch 19 in each track head which make a gap in the track and in putting together the parts of the machine we so arrange them that each flier as its path of rotation crosses that of the periphery of the track heads, passes within the gap 19 therein, the flier moving within this gap just before the carrier crosses it and moving out of the gap after the carrier has crossed it (see Fig. 4). By this means the necessary interlocking takes place, the arm 28 being shaped to prevent interference with the flier and to insure the proper interlocking arrangement of the strands which pass from the flier and the arms 28 directly to the braiding point located at the top of the machine.

The die F is supported from one of the cross-bars $E^3$ on the frame formed by the uprights $E^2$ and the same cross-bar carries a suitable sheave $E^4$ mounted on a shaft $E^5$ supported in bearings and carrying a gear (not shown) engaging the worm $E^6$ on the shaft $E^7$ which is rotated by a gear and worm $E^8$ on the shaft $B^5$.

It will be seen from the above description that each of the strands 29 is interlocked with two adjoining strands $p$ and each strand $p$ is interlocked with two adjoining strands 29 so that the strands are united into a common fabric, while during the braiding operation the entire body of strands is twisted by the revolving of the table A with relation to the die F.

We have shown this machine as comprising six lower bobbins and six upper bobbins, but as will occur to anyone skilled in the art, the number of fliers, carriers and track heads may be varied according to the size of the cord to be braided and the number of strands it is to contain. The number of flier arms and bobbin frames upon a flier carrier and the number of carriers and gaps to a track head may also be varied as may be desired.

Where it is desirable to use a stationary table it is of course necessary that the twist shall be given to the cord by the rotation of the braiding point or the winding mechanism by which the cord is wound after it has been braided. We have shown such a construction in Fig. 6. In this case the table is lettered $A^1$ and is carried by uprights $E^2$ forming a frame for the machine supported on legs $E^1$ and carrying a plate E as in the main form of our machine. The lower bobbins instead of being mounted in rotating frames, however, are mounted in supports $n^2$ located below the machine and the strands $p$ are carried by their fliers $o$ constructed and operating in the same manner as in the main form of our machine. The other strands 29 are drawn from bobbins carried in bobbin frames 27 attached to carriers 21 which travel around track heads 12 as before.

The die F is carried at the lower end of a hollow spindle $F^1$ which has just above the braiding point F a gear $f$ which meshes with the train of gears, one $f^1$ of which is carried and rotated by the shaft $E^7$. The braided cord P passes up from the die through the center of the spindle $F^1$ and over a guiding pulley $P^1$ to one of a pair of capstans $P^2$ over which and its neighbor $P^3$ it passes say three times and from thence to a winding guide mechanism $P^4$ of ordinary construction by which it is directed to a reel L. The capstan $P^2$ is rotated positively by a gear $f^5$ on the stud with it. Motion is given to the gear $f^5$ from the spindle $F^1$ by means of the gear $f^2$ thereon and the intermediate gears $f^3$ and $f^4$. The reel L is rotated from the shaft $E^7$ by means of the pulleys $L^1$, $L^2$ which are connected by a belt $l$. The guide mechanism is operated by means of a train of gears $P^5$ one of which is on the shaft of the guide mechanism and the other on the shaft carrying the reel L.

The mechanism above described is a simple and convenient means for accomplishing the desired result, but we do not mean to limit ourselves to this embodiment of our invention as one skilled in the art will readily appreciate that various mechanical details may be altered without departing from the spirit of our invention.

It will be understood by anyone familiar with the art that the bobbin holders of the fliers and the carrier, would ordinarily be provided with tension springs to prevent the bobbins from over-running; also, with tensions upon the strands to determine the pull upon the strands in braiding, and may also be equipped with stop motions to cause the stoppage of the machine when the strands wound upon any bobbin shall be exhausted, or when any strand shall become broken. The introduction of these parts would so complicate the drawings that they have been omitted, their introduction, and association with the other parts of our machine having no bearing upon our present invention. Moreover, the machine is operative as we have shown it in the drawings.

What we claim as our invention is:—

1. In a braiding machine of the kind described, two sets of strand supplies, one comprising fliers and the other comprising carriers and track heads carrying said carriers, each track head having but one gap in its periphery for the passage of said fliers about said carriers, as described.

2. In a braiding machine of the kind described, two sets of strand supplies, one comprising rotary fliers and the other comprising carriers, in combination with track heads, each track head carrying a carrier capable of rotation about its periphery and having but one gap in its periphery whereby a flier in its rotation may cross the path of said periphery and pass around the carrier carried by said track head, as described.

3. In a braiding machine of the kind described, means for making an interlocking twist comprising two sets of strand supplies, one comprising fliers and the other comprising carriers and track heads carrying said carriers, each track head having but one gap in its periphery for the passage of said fliers about said carriers, and means for giving a twist to the braided strands, as described.

4. In a braiding machine of the kind described, means for making an interlocking twist comprising two sets of strand supplies, one comprising rotary fliers and the other comprising carriers, in combination with track heads, each track head carrying a carrier capable of rotation about its periphery and having but one gap in its periphery whereby a flier in its rotation may cross the path of said periphery and pass around the carrier carried by said track head, and means for giving a twist to the braided strands, as set forth.

5. In a braiding machine of the kind described, two sets of strand supplies one comprising rotary fliers and the other comprising carriers, supporting plates for said carriers having gaps for said fliers, means for rotating said supporting plates, and means for causing the rotation of said carriers about said plates, as set forth.

6. In a braiding machine of the kind described, strand-bearing fliers, means for rotating the same, carrier-supporting plates, strand-bearing carriers, means for causing them to travel around said supporting plates, said plates having openings for the passage of the fliers, means for revolving said plates, and means for producing a common twist in both series of strands.

7. In a machine of the kind described, tubular spindles, strand-bearing bobbins, bent fliers mounted thereon, carrier-supporting plates, means for the carriers to travel about said plates, and means for revolving said plates, said plates having openings in their edges for the passage of fliers about said carriers, as described.

8. In a machine of the kind described, strand-bearing fliers, carrier-supporting plates having openings for the passage of said fliers, tracks formed in said plates for supporting and guiding the strand-bearing fliers, means for revolving said plates, and means for causing said carriers to travel around said plates, and means for producing a general twist of all of the strands, substantially in the manner set forth.

9. In a machine of the character described, carrier-supporting heads consisting of upper and lower plates with circular tracks recessed in the same, openings in said plates for the passage of flier arms, carriers having guiding segments adapted to move in the tracks in said plates, and means causing the heads to revolve in one direction while the carriers travel around them in the opposite direction, substantially as and for the purposes set forth.

10. In a braiding machine, a series of carrier-supporting heads each comprising a track head and means whereby said carrier supporting heads are rotated, each track carrying a carrier adapted to be rotated therein, means for rotating each carrier in its track head, each track head being provided with a gap in the path of the carrier, in combination with a series of fliers, means whereby each flier may be rotated, the path of each flier intersecting the path of two of said carriers whereby the flier strand is caused to interlock with the two adjacent carrier strands, as described.

11. In a machine of the character described, a series of track heads each provided with a gap in its periphery and each carrying a carrier adapted to rotate around said track heads across said gap and means for rotating said track heads and rotating each carrier, in combination with a series of rotary fliers each located between two of said track heads, and means whereby said fliers are rotated across the path of the carriers in the two adjacent track heads, whereby the strands of said fliers and said carriers are interlocked, and means whereby the strands after they are interlocked are given a twist, as set forth.

12. In a machine of the kind described having two sets of strand-delivering instrumentalities, one comprising a series of carriers and the other a series of fliers, means whereby each of said series of fliers will interlock its strand about the strands of the carriers on each side of it, and means whereby each carrier strand will be interlocked with the flier strand on each side of it, the means for operating each carrier comprising a revolving track head, each carrier being adapted to rotate about said track head, and each track head having a gap interrupting the path of said carrier but adapted to be crossed by said carrier in its rotation, each flier being located to enter the gaps in the adjacent track heads, as and for the purposes described.

13. In a braiding machine of the kind described, two sets of strand supplies, one comprising fliers and the other comprising carriers, and track heads carrying said carriers, each track head being rotatable and having a gap in its periphery for the passage of said fliers about said carriers, as set forth.

14. In a braiding machine of the kind described, two sets of strand supplies, one comprising fliers and the other comprising carriers, and track heads carrying said carriers, each track head having a gap in its periphery for the passage of a flier about a carrier, and means for causing said flier to enter said gap and after the passage of said carrier thereby to leave said gap by a course approximately the opposite to that by which it entered, as described.

JAMES P. TOLMAN.
HERBERT G. PRATT.

In the presence of—
MARION M. STRONG,
ETHEL CHANDLER.